US007519694B1

United States Patent
Arcot

(10) Patent No.: US 7,519,694 B1
(45) Date of Patent: Apr. 14, 2009

(54) METHOD AND A SYSTEM TO DYNAMICALLY UPDATE/RELOAD AGENT CONFIGURATION DATA

(75) Inventor: Rajesh Kumar Arcot, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 646 days.

(21) Appl. No.: 11/210,390

(22) Filed: Aug. 24, 2005

(51) Int. Cl.
*G06F 15/177* (2006.01)
(52) U.S. Cl. .................. 709/220; 709/202; 719/317
(58) Field of Classification Search .......... 709/202, 709/221, 222; 719/317
See application file for complete search history.

(56) References Cited

U.S. PATENT DOCUMENTS

| | | | | |
|---|---|---|---|---|
| 6,012,083 A * | 1/2000 | Savitzky et al. | ............ | 709/202 |
| 6,070,187 A * | 5/2000 | Subramaniam et al. | ..... | 709/220 |
| 6,233,582 B1 * | 5/2001 | Traversat et al. | ............ | 707/102 |
| 6,289,377 B1 * | 9/2001 | Lalwaney et al. | ........... | 709/222 |
| 6,892,225 B1 * | 5/2005 | Tu et al. | ..................... | 709/217 |
| 7,103,889 B2 * | 9/2006 | Hiltgen | ....................... | 719/317 |
| 7,131,020 B2 * | 10/2006 | Moll et al. | .................. | 713/375 |
| 7,165,087 B1 * | 1/2007 | Graupner et al. | ............ | 709/202 |
| 7,188,169 B2 * | 3/2007 | Buus et al. | ................... | 709/224 |
| 2002/0152289 A1 * | 10/2002 | Dube | ......................... | 709/220 |
| 2004/0216126 A1 * | 10/2004 | Hiltgen | ....................... | 719/311 |
| 2005/0055449 A1 * | 3/2005 | Rappold, III | ............... | 709/228 |
| 2005/0114397 A1 * | 5/2005 | Doshi et al. | ............. | 707/104.1 |
| 2005/0273668 A1 * | 12/2005 | Manning | ..................... | 714/39 |
| 2006/0168239 A1 * | 7/2006 | Gauthier | .................... | 709/227 |
| 2006/0242132 A1 * | 10/2006 | Smith | ............................ | 707/3 |

* cited by examiner

*Primary Examiner*—Michael Won
(74) *Attorney, Agent, or Firm*—Osha • Liang LLP

(57) ABSTRACT

A method for updating agent configuration data that includes specifying an arbitrary configuration Uniform Resource Locator (URL) for an agent, wherein the arbitrary configuration URL is not associated with a physical web resource, intercepting a modify request to the arbitrary configuration URL by the agent, updating agent configuration data in response to the modify request, and updating an agent module using updated agent configuration data.

17 Claims, 5 Drawing Sheets

METHOD AND A SYSTEM TO DYNAMICALLY UPDATE/RELOAD AGENT CONFIGURATION DATA

BACKGROUND

A typical distributed computer system includes multiple nodes. Each node may send and/or receive requests to/from other nodes. In the client/server model of the distributed computer system, a client sends a request to the server. The server receives the request, processes the request and sends a result back to the client. In order to process the request, the server may have a web application to provide the services.

When a client sends the request to the web application, the client specifies the Uniform Resource Locator (URL) for the server. The URL provides a specific address of the server and the web application on the server. In order to provide extensions to serve the multiple web applications, agents (such as filters, servlets, and plugins) are developed. An agent may be used, for example, to log and authenticate the client, debug and transform the output for a client, uncompress and encode the input from the client, etc. Further, the agent may be used in a manner transparent to the client. For example, when a client sends a request to the URL for the web application, the request may be intercepted by an agent, unbeknownst to the client. Upon intercepting the request, the agent may perform a preprocessing step prior to forwarding the request to the web application. For example, before allowing a client to view restricted data, an agent may check a database for access conditions for the client. This allows for the extended functionality, such as security, to be performed in the background.

Because the agent is transparent to the client, the agent does not have a physical web resource. Rather, the agent is only associated with the URL of the web application. An agent may be associated with one or more URL's. For example, the same agent may be used to ensure that the access rights have been satisfied for all web applications associated with a family of URLs.

Also associated with the agent is the configuration data for the agent. The configuration data for the agent may specify the operational behavior of the agent. For example, the configuration data may specify authentication properties, session properties, level of security enforcement, caching parameters, etc.

In order to load configuration data into the agent, the configuration data for the agent is read during initialization time of the application or the web server. Thus, in order to change the configuration data, a user needs to find the configuration data on the server and make the changes to the configuration data.

Once the changes are made to the configuration data, the server is restarted to apply the changes to the agents using the configuration data. As the server may be used concurrently by multiple users, restarting the server may interrupt several users. Accordingly, restarting the server is typically performed during non-peak hours, which may occur several hours after the changes to the configuration data are made.

One method of checking for the changes made to the configuration data is to constantly poll the configuration data. When a change is noticed, event listeners are notified of the changes. Polling the configuration data may occur, for example, at certain time intervals. By adjusting the length of the time intervals, a user may choose between how current the agent is with respect to the configuration data and performance overhead associated with polling.

SUMMARY

In general, in one aspect, the invention relates to a method for updating agent configuration data that includes specifying an arbitrary configuration Uniform Resource Locator (URL) for an agent, wherein the arbitrary configuration URL is not associated with a physical web resource, intercepting a modify request to the arbitrary configuration URL by the agent, updating agent configuration data in response to the modify request, and updating an agent module using updated agent configuration data.

In general, in one aspect, the invention relates to a system for updating agent configuration data that includes an agent configured to specify an arbitrary configuration Uniform Resource Locator (URL) for the agent, wherein the arbitrary configuration URL is not associated with a physical web resource, intercept a request to a web application from a remote client, determine whether the request is a modify request to the arbitrary configuration URL, update agent configuration data in response to the modify request, update an agent module using updated agent configuration data, determine whether the request is not to the arbitrary configuration URL, and transfer control of the request to the web application if the request is not to the arbitrary configuration URL, and the web application configured to respond to the remote client when the request is not directed to the arbitrary configuration URL.

In general, in one aspect, the invention relates to a computer usable medium having computer readable program code embodied therein for causing a computer system to specify an arbitrary configuration Uniform Resource Locator (URL) for an agent, wherein the arbitrary configuration URL is not associated with a physical web resource, intercept a modify request to the arbitrary configuration URL by the agent, update agent configuration data in response to the modify request, and update an agent module using updated agent configuration data.

Other aspects and advantages of the invention will be apparent from the following description and the appended claims.

DETAILED DESCRIPTION

Figure 1:
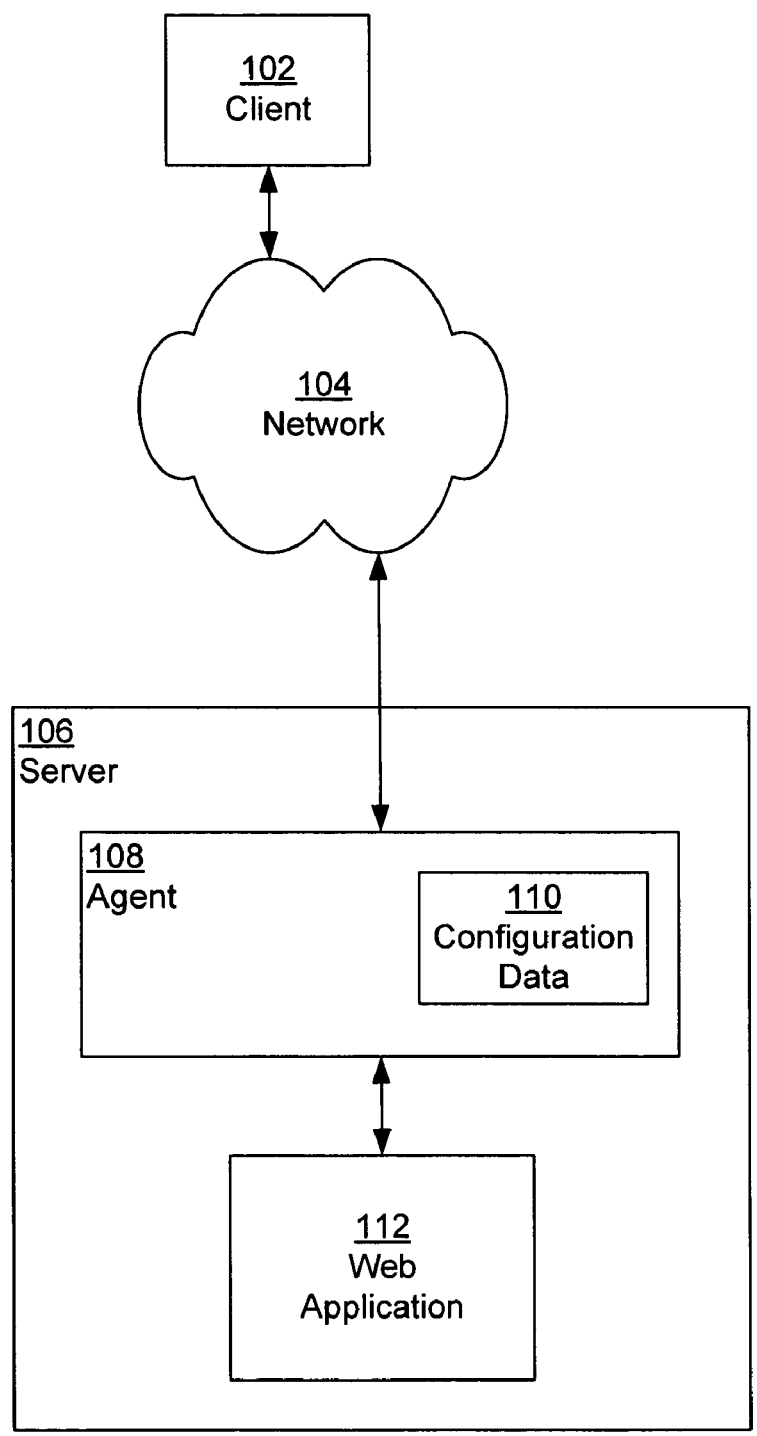
FIG. 1 shows a system for updating and reloading configuration data in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention provide a method and a system for updating an agent with respect to the modified configuration without enduring the overhead associated with polling. Specifically, embodiments of the invention provide an arbitrary Uniform Resource Locator (URL) which allows for a user to access and update the agent configuration data and update the agent with respect to the updated configuration data without knowledge of the exact location of the configuration data.

FIG. 1 shows a system for updating and reloading configuration data in accordance with one embodiment of the invention. As shown in FIG. 1, a client (102) is operatively connected to a server (106) via a network (104). The server, in accordance with one embodiment of the invention, has an agent (108) with configuration data (110) and a web application (112). Each of these aforementioned components is discussed below.

In one embodiment of the invention, a client (102) is any type of device which is operatively connected to a network. For example, the client (102) may be a computer, a PDA, a cell phone, an embedded system (such as those found in automobiles, consumer appliances, etc.), or any other device that could connect to a network. Moreover, the client may be any type of device which has functionality to send requests over the network.

The network (104) may correspond to an interconnection of computers and related devices. The network (104) may correspond to a local area network (LAN), a wide area network (e.g., the Internet), a combination thereof, etc. Using the interconnection, the network includes functionality to transfer requests and responses between the client (102) and the server (106). Specifically, the network (104) may include one or more routers for passing requests and responses. The server (106), in one embodiment of the invention, is any type of device which has functionality to receive requests and submit responses. The server (106) may be a web server, database server, etc. Further, the server may be an interconnection of nodes in a computer system. Specifically, an initial node (106) may receive a request and send the request to a backend server for processing. In one embodiment of the invention, the server (106) includes a web application (112) and an agent (108).

The web application (112) is any type of application that is connected to a network and includes functionality to service requests from the network (104). Specifically, in one embodiment of the invention, the web application (112) may be an application which provides functionality via the network (104). For example, the web application (112) may be a business type application (e.g., administrative application, shopping portal, accounting application, etc.), a database manipulation applications, an educational application, a help application, etc. Further, the web application (112) may be composed of a series of dynamically generated web pages. The web application (112) may be written in virtually any programming language known in the art such as JavaScript™, PHP, ASP, Hypertext markup language (HTML), etc. In one embodiment of the invention, the request may be a Hypertext Transfer Protocol (HTTP) GET request, a POST request, a PUT request, etc.

In one embodiment of the invention, interposed between the network (104) and the web application (112) is an agent (108). The agent (108), in one embodiment of the invention, extends the functionality provided by the web application. In one embodiment of the invention, the agent (108) may be a filter (e.g., JAVA servlet-filter, etc.), a plug-in (e.g., NSAPI, IISAPI based, etc.), a servlet, etc.

Further, the agent (108), in accordance with one embodiment of the invention, may be transparent to the client. Specifically, the agent (108) may not be associated with any physical web address. Those skilled in the art will appreciate that an agent may be connected to multiple agents (108) and each agent (108) performs specific functions. For example, one agent (108) could provide authentication functions while another agent performs data manipulation functions.

In one embodiment of the invention, the agent includes configuration data (110). The configuration data (110) may determine how the agents operate. For example, the configuration data (110) could associate the agent (106) with the URL of the application, provide initialization parameters, etc. Those skilled in the art will appreciate that the configuration data (110) may be stored with the server (106) or separate from the server (106) (not shown).

Further, those skilled in the art will appreciate that the configuration data may be stored in a data repository (not shown). The data repository, in accordance with one embodiment of the invention may be a flat-file, hierarchical, relational database, or any other storage unit for data. Further, the data repository may be part of the configuration manager (154) or associated with the configuration manager. In accordance with one embodiment of the invention, the data repository may be stored separately from the agent. Alternatively, the data repository may be stored with the agent.

Figure 2:
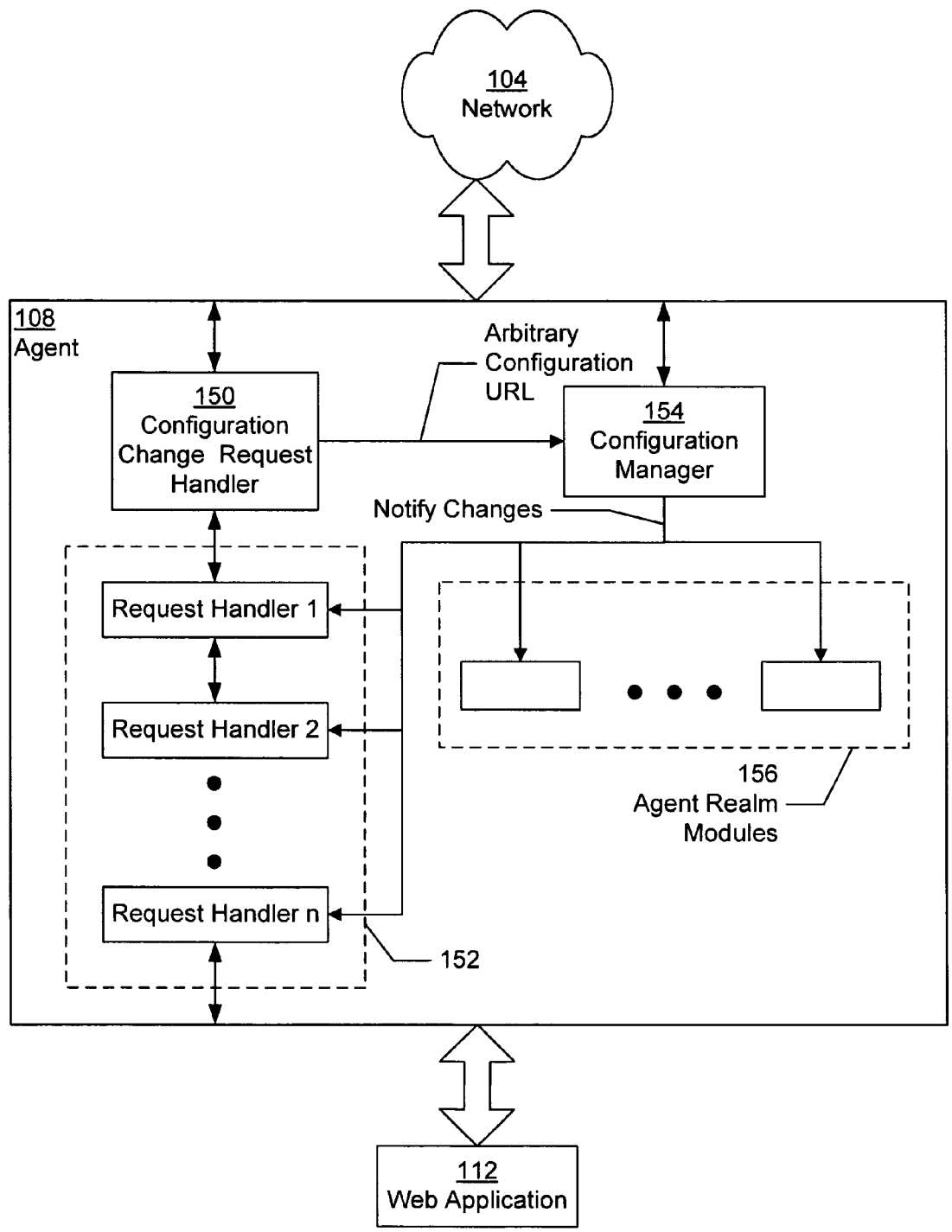
FIG. 2 shows an agent for updating and reloading configuration data in accordance with one embodiment of the invention.

FIG. 2 shows an agent (108) for updating and reloading configuration data in accordance with one embodiment of the invention. The agent (108) described in FIG. 1 may be divided into components of the agent (108) as shown in FIG. 2. Specifically, the agent (108) may include a configuration change request handler (150), request handlers (152), configuration manager (154), and agent realm module(s) (156). Each of these aforementioned components is described in more detail below.

The configuration change handler (150) corresponds to a handler which includes functionality to intercept a request received from the network (104) and determine whether the request is sent to the arbitrary configuration URL. In accordance with one embodiment of the invention, the arbitrary configuration URL is in the same namespace as the URL for the server. Further, the URL may be in the same namespace as the web application. For example, if the address of the web application is www.webapp.com/sales, then the arbitrary configuration URL may be www.webapp.com/sales/Agent-Configuration. In one embodiment of the invention, because the agent is not associated with a physical web address, the arbitrary configuration URL may also not be associated with a physical web address. Specifically, the actual web resource specified web address may not exist. Accordingly, those skilled in the art will appreciate that virtually any URL may be used.

Continuing with the configuration change handler (150), if the request is sent to the arbitrary configuration URL, then the configuration change handler includes functionality to pass the request to the configuration manager (154). Otherwise, if the request is not a arbitrary configuration URL, then the configuration change request handler (150) may include functionality to forward the request to another request handler (152). Accordingly, operatively connected to the configuration change request handler (150) is one or more other request handlers (152) and a configuration manager (154). Each of these components is described below.

In one embodiment of the invention, a request handler (152) includes functionality to perform the pre/post-processing of the requests. Specifically, a request handler (152) may include functionality to examine the request, verify if any action is needed for the request handler to perform, and perform specific processing. Those skilled in the art will appreciate that the request handlers (152) may be independent (i.e., not aware of other request handlers (152) on the agent (108)). Accordingly, after processing the request, a request handler (152) may include functionality to pass the request to the next request handler (152) in the chain or back to the client if the request handler (152) determines that the request needs to be blocked or redirected back to the client for specific action.

The request handlers (152) may, for example, correspond to a Single Sign On (SSO) request handler, a Notification request handler, Web Service Request handler, an Audit request handler, etc. Each of the aforementioned handlers are described in more detail below.

For example, in one embodiment of the invention, a request handler (152) may correspond to a SSO request handler, which includes functionality to verify the presence of client session information. If a valid session is present, then the SSO request handler may allow the request to pass to the next request handler (152). Alternatively, if no session information is found, then the SSO request handler may redirect the request to the authentication server by sending the request back to the client.

In addition to the SSO request handler, a request handler (152) may correspond to a Notification request handler, which includes functionality to examine the request and verify whether a session expiration notification is sent by an authentication server. If a session expiration notification is sent by the authentication server, then the Notification request handler may include functionality to terminate the local session for the client in the agent's server.

Further, a request handler (152) may correspond to a Web Service request handler in accordance with one embodiment of the invention. The Web Service request handler may include functionality to verify whether the request is a web service request. If the request is a web service request, then the Web Service request handler may include functionality to perform special authentication by validating the credentials supplied in the web service request. Upon successful authentication, the Web Service request handler may allow the request to pass through to the specified web service.

In one embodiment of the invention, a request handler (152) may correspond to an Audit request handler which includes functionality to log the request and client information locally or on a centralized server in a specified format allowing for an administrators to track the users of the web application (112).

Those skilled in the art will appreciate that there are numerous types of request handlers of which the aforementioned request handlers are examples.

Continuing with FIG. 2, in one embodiment of the invention, also operatively connected to the configuration change request handler (150) is a configuration manager (154). A configuration manager (154) may include functionality to manage the configuration data. Specifically, in one embodiment of the invention, the configuration manager (154) may include functionality to determine whether a request is a read request or modify request, forward the configuration data to the client, save changes to the configuration data, and notify the request handlers (152) and any agent realm modules (156) of changes made to the configuration data. An agent realm module (156), in one embodiment of the invention, corresponds to a component which includes functionality to map and/or authenticate a user from a custom realm to the server of the agent. A custom realm corresponds to a collection of users and/or groups in accordance with one embodiment of the invention.

Figure 3:
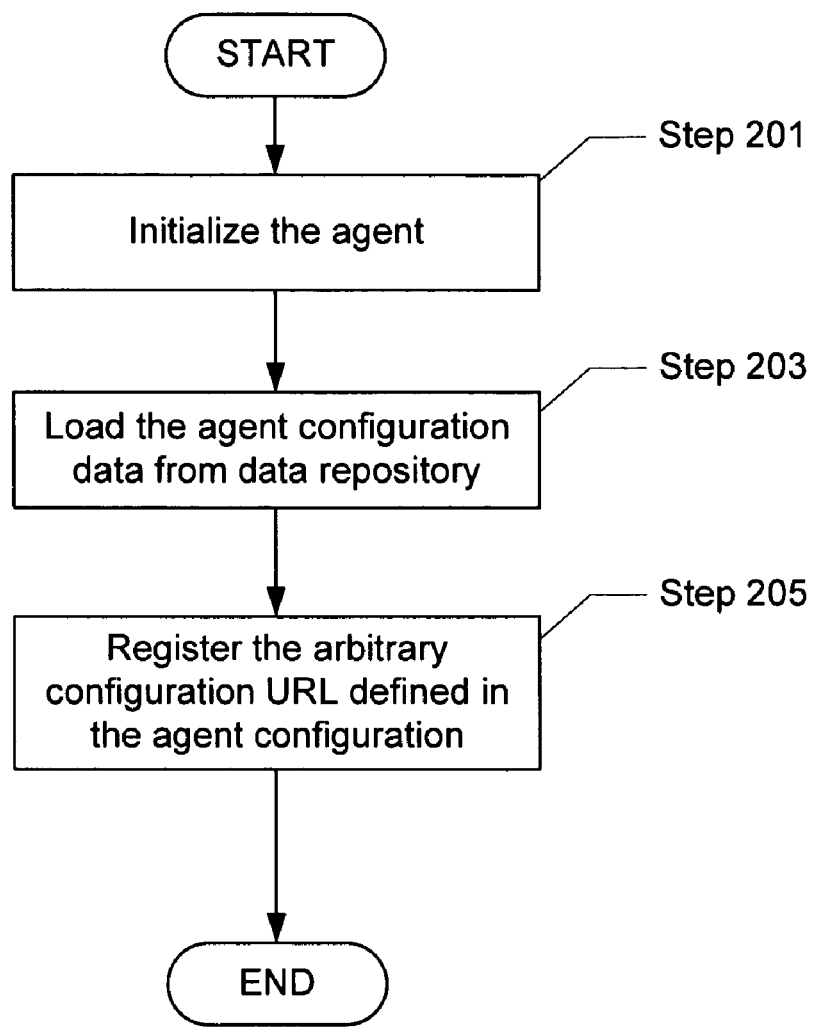
FIG. 3 shows a flowchart for setting up the configuration data with an agent in accordance with one embodiment of the invention.

FIG. 3 shows a flowchart for initializing the agent configuration data with an agent in accordance with one embodiment of the invention. Initially, the agent is initialized (Step 201). This may include, for example, creating an instance of the agent on the server. Next, the agent configuration data is loaded from the data repository (Step 203). In one embodiment of the invention, loading the configuration data may be performed by a configuration data reader in the configuration manager. After the agent configuration data is loaded, then an arbitrary configuration URL is registered in the agent configuration (Step 205). Once the arbitrary configuration URL is registered, then in accordance with one embodiment of the invention, the user may access the web application and the agent configuration data. In one embodiment of the invention, the arbitrary configuration URL may be protected by the agent by adding authorization steps to allow only specific users to view or change the configuration data. Accordingly, the authorization steps provide fine grained access control for viewing and modifying configuration data for agents.

Figure 4:
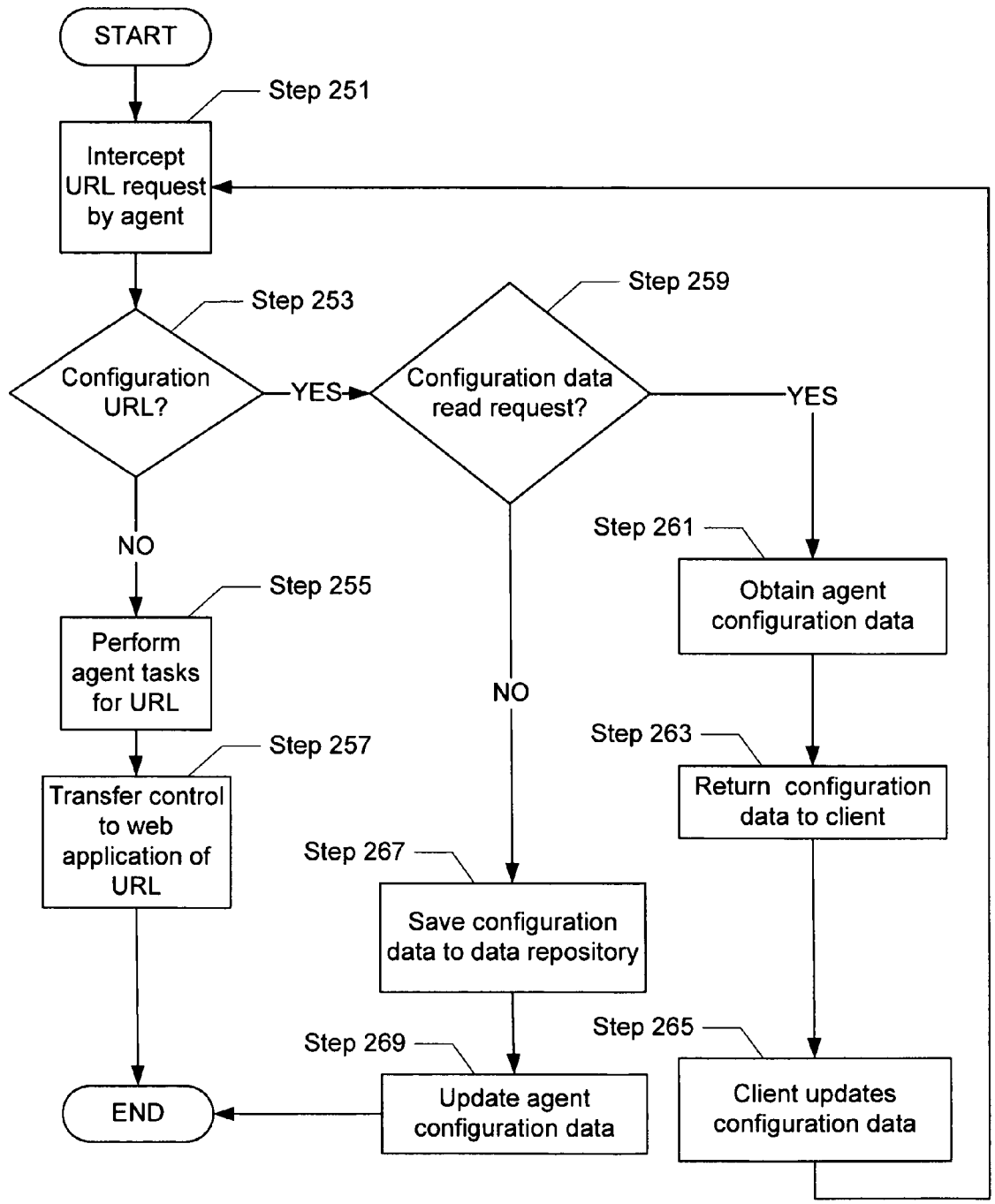
FIG. 4 shows a flowchart for updating and reloading configuration data in accordance with one embodiment of the invention.

FIG. 4 shows a flowchart for updating and reloading agent configuration data in accordance with one embodiment of the invention. Initially, a URL request is received at the server and intercepted by the agent (Step 251). The request may be, for example, in the form of an Hypertext Transfer Protocol (HTTP) GET request, a POST request, a PUT request, etc. Next, a determination is made as to whether the requested URL is a configuration URL (Step 253).

If the requested URL is not a configuration URL, in one embodiment of the invention, agent tasks are performed for the URL (Step 255). The agent tasks may include, for example, authentication tasks, such as a verifying the presence of client session identifiers or whether a session notification is sent by the authentication server, logging the request, etc. After the agent tasks are performed, then control is transferred to the web application of the URL (Step 257). Those skilled in the art will appreciate that the agent tasks may include transferring control to one or more other agents. Further, the web application may respond to the agent and transfer control to the agent to perform post-processing tasks.

If the URL request is a configuration URL request, then in one embodiment of the invention, a determination is made as to whether a client making the request is authorized to make such a request (not shown). If the client is authorized to make the request, then the method proceeds with FIG. 4.

If the URL request is a configuration URL, then a determination is made as to whether the request is a configuration data read request (Step 259). If the request is a configuration data read request, then the agent configuration data is obtained (Step 261). Those skilled in the art will appreciate that the configuration data read request may be in the form of a GET request to the configuration URL. Obtaining the agent configuration data may be performed for example, by accessing the configuration manager.

After the agent configuration data is obtained, the configuration data may be returned to the client (Step 263). The configuration data may be returned to the client in virtually any manner known in the art, such as a web form, a data file, etc.

Next, the client may update the configuration data (Step 265). Updating the configuration data may include changing authentication properties, session properties, level of security enforcement, caching parameters, etc. Once the client updates the configuration data, the client may send the updates to the server (not shown). This may be performed, for example, through an HTTP POST request to the configuration URL. Those skilled in the art will appreciate that the POST request may be optionally sent to a separate URL specific to updating the configuration data. When the request arrives at server, in accordance with one embodiment of the invention, the request is intercepted by the agent (Step 251).

Alternatively, if the URL is not a configuration data read request, then (Step 259), then the request is a configuration data modify request. In one embodiment of the invention, the configuration data modify request may be a HTTP POST request. Accordingly, the modified configuration data is saved to a data repository (Step 267). In one embodiment of the invention, saving the configuration data to the data repository may be performed by the configuration manager.

Once the configuration data is saved to the data repository, then the agent configuration data is updated (Step 269). This may be performed, for example, through a hot swap with the agent modules, such as the request handlers and the agent realm modules.

Figure 5:
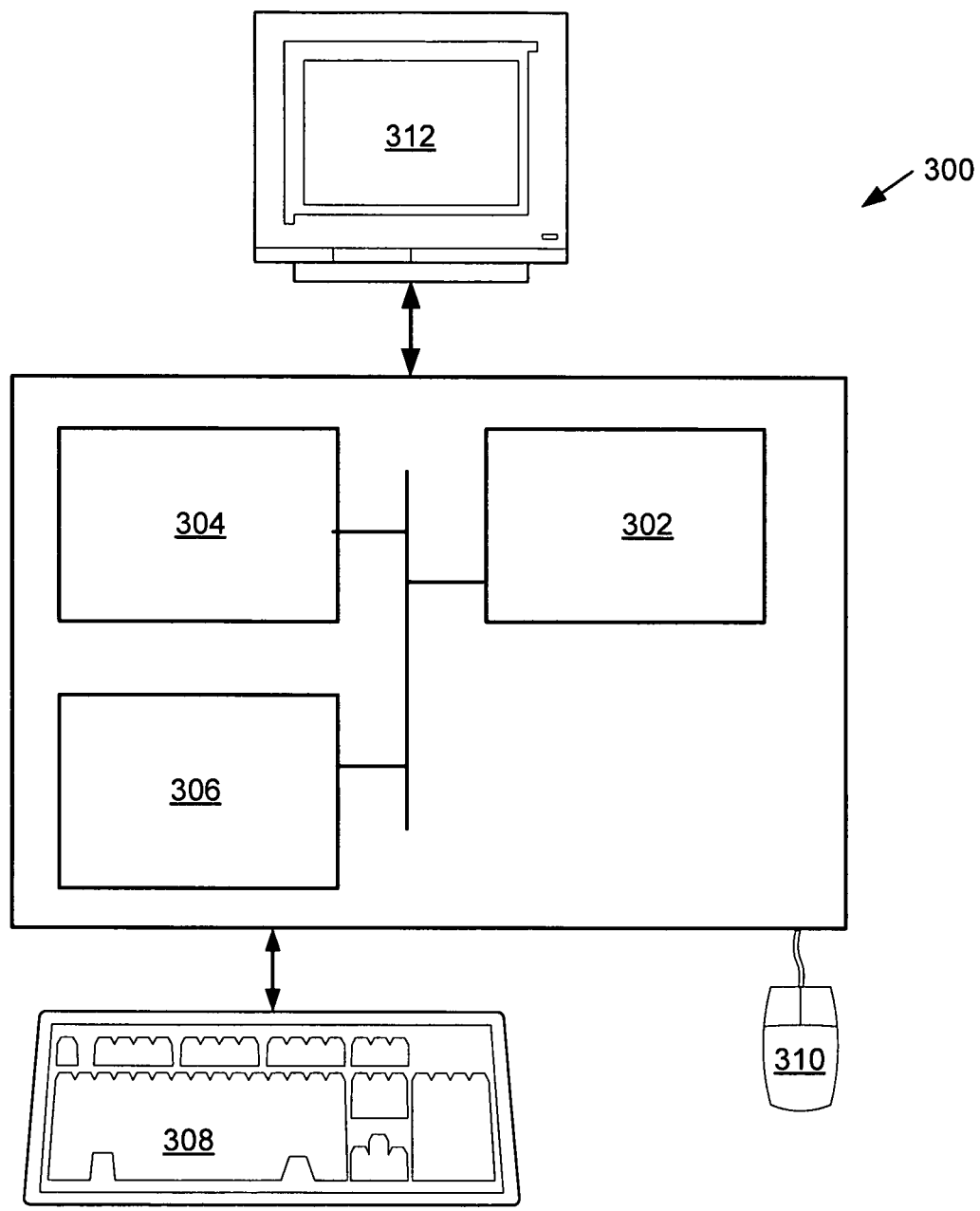
FIG. 5 shows computer system in accordance with one embodiment of the invention.

The invention may be implemented on virtually any type of computer regardless of the platform being used. For example, as shown in FIG. 5, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., Agent, Client, Configuration Data, Web Application, etc.) may be located on a different node within the distributed system.

In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

Embodiments of the invention have one or more of the following advantages. First, embodiments of the invention provide a simple and scalable solution using plugins for the configuration data. Specifically, without directly accessing the server and the agent configuration data on a server, a user may provide an arbitrary URL to the server and obtain and modify the agent configuration data. Further, embodiments of the invention provide a mechanism for a user to update the agent configuration data dynamically at runtime and have the updates be immediately applied to the agent. Accordingly, embodiments of the invention provide a mechanism to keep the agent consistently updated.

Further, embodiments of the invention allow for protecting an agent configuration data by the agent, in the same manner as other URL's thereby providing a unified means to control access to view/modify agent configuration data. Such access control may be defined, for example, on a central authentication/authorization server.

Additionally, embodiments of the invention provide a mechanism for a user to change the security and logging levels and see the effect immediately. By having the security changes and logging levels changed immediately, intruder may be identified and blocked immediately.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for updating agent configuration data comprising:

intercepting by an agent, a first request for a web application, wherein the first request comprises an address of the web application;

sending, by the agent, the first request to the web application;

intercepting, by the agent, a second request to modify agent configuration data of the agent, wherein the second request is addressed to an arbitrary configuration Uniform Resource Locator (URL) for the agent, wherein the arbitrary configuration URL is not associated with a physical web resource, and wherein the arbitrary configuration URL is an address for configuring the agent, and wherein the address for configuring the agent is in the same namespace as the address of the web application;

updating, by the agent, the agent configuration data in response to the second request; and updating an agent module using updated agent configuration data, wherein the agent module is a component of the agent.

2. The method of claim 1, further comprising:

performing an agent task on the first request, by the agent prior to sending the first request to the web application.

3. The method of claim 1, further comprising:

intercepting a read request to the arbitrary configuration URL from a remote client; and returning the agent configuration data to the remote client.

4. The method of claim 1, wherein the agent is a plugin.

5. The method of claim 1, wherein the agent is a servlet.

6. The method of claim 1, wherein the agent is a filter.

7. The method of claim 1, wherein updating the agent module is performed using hotswap.

8. The method of claim 2, further comprising:

identifying a remote client sending the second request; and determining whether the remote client is authorized to access the agent configuration data.

9. A system for updating agent configuration data comprising:

an agent configured to:

intercept a first request for a web application from a remote client, wherein the first request comprises an address of the web application;

transfer the first request to the web application;

intercept a second request to modify agent configuration data of the agent wherein the second request is addressed to an arbitrary configuration Uniform Resource Locator (URL) for the agent, wherein the arbitrary configuration URL is not associated with a physical web resource, and wherein the arbitrary configuration URL is an address for configuring the agent, and wherein the address for configuring the agent is in the same namespace as the address of the web application;

identify the second request as a modify request to the arbitrary configuration URL;

update the agent configuration data in response to the modify request;

update an agent module using updated agent configuration data, wherein the agent module is a component of the agent; and the web application configured to respond to the remote client when the request is not directed to the arbitrary configuration URL.

10. The system of claim 9, wherein the agent is further configured to:

intercept a read request to the arbitrary configuration URL; and return the agent configuration data to the remote client in response to the read request.

11. The system of claim 9, wherein the agent is a plugin.

12. The system of claim 9, wherein the agent is a servlet.

13. The system of claim 9, wherein the agent is a filter.

14. The system of claim 9, wherein updating the agent module is performed using hotswap.

15. The system of claim 10, wherein the agent is further configured to determine whether the remote client is authorized to access agent configuration data.

16. A computer usable medium having computer readable program code embodied therein for causing a computer system to:

intercepting by an agent, a first request for a web application, wherein the first request comprises an address of the web application;

sending, by the agent, the first request to the web application;

intercepting, by the agent, a second request to modify agent configuration data of the agent, wherein the second request is addressed to an arbitrary configuration Uniform Resource Locator (URL) for the agent, wherein the arbitrary configuration URL is not associated with a physical web resource, and wherein the arbitrary configuration URL is an address for configuring the agent, and wherein the address for configuring the agent is in the same namespace as the address of the web application;

update, by the agent, the agent configuration data in response to the second request; and update an agent module using updated agent configuration data, wherein the agent module is a component of the agent.

17. The computer usable medium of claim 16, further comprising:

intercept a read request to the arbitrary configuration URL from a remote client; and return the agent configuration data to the remote client.

* * * * *